US006428928B1

(12) United States Patent
Harada et al.

(10) Patent No.: US 6,428,928 B1
(45) Date of Patent: Aug. 6, 2002

(54) BATTERY AND CAPACITOR USING QUINOXALINE RESIN

(75) Inventors: Gaku Harada; Toshihiko Nishiyama; Masaki Fujiwara; Shinako Okada; Masato Kurosaki, all of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/520,797

(22) Filed: Mar. 8, 2000

(30) Foreign Application Priority Data

Mar. 11, 1999 (JP) .......................................... 11-065183

(51) Int. Cl.$^7$ ................................................ H01M 4/60
(52) U.S. Cl. ...................................... 429/212; 429/213
(58) Field of Search ............................... 429/232, 212, 429/213

(56) References Cited

U.S. PATENT DOCUMENTS

| 4,755,326 A | * | 7/1988 | Liepins et al. | ............... 252/518 |
| 4,768,130 A | | 8/1988 | Bernard et al. | |
| 5,731,106 A | * | 3/1998 | Tsutsumi et al. | ........... 429/197 |
| 6,174,623 B1 | * | 1/2001 | Shackle | .................. 429/218.1 |

FOREIGN PATENT DOCUMENTS

| JP | 03230475 A | * | 10/1991 |
| JP | 3-230475 | | 10/1991 |
| JP | WO 95/24741 | | 9/1995 |
| JP | 9-3171 | | 1/1997 |
| JP | A 10-289617 | | 10/1998 |
| JP | WO 99/66572 | | 12/1999 |
| WO | WO 9429314 | | 12/1994 |
| WO | WO 9524741 | | 9/1995 |
| WO | WO 9715607 | | 5/1997 |

OTHER PUBLICATIONS

Chemistry, Second Edition by McMurry & Fay 1995, pp. 190–191.*

Eui–hwan Song et al., "Properties of Polyphenylquinoxaline Acid Complex as an Electrode Material," *J. Electrochem. Soc.*, V. 145, 1998, pp. 1193–1196.

E. Song et al., "Properties of Polyphenylquinoxaline Acid Complex as an Electrode Material," J. Electrochem. Soc., vol. 145, No. 4, Apr. 1998, pp. 1193–1196.

M. Petit, "Electrochemical Properties of Polyphenylquinoxaline Films," J. Electrochem. Soc., vol. 140, No. 9, Sep. 1993, pp. 2498–2500.

* cited by examiner

*Primary Examiner*—Gabrielle Brouillette
*Assistant Examiner*—Monique Wills
(74) *Attorney, Agent, or Firm*—Young & Thompson

(57) ABSTRACT

The present invention provides an electrode containing a quinoxaline resin and an electrolyte which includes at least one of sulfuric acid ions and sulfonic acid ions, or the electrolyte which includes cations having ion radius of not more than 3 angstroms.

78 Claims, 7 Drawing Sheets

1 : cathode     2 : anode     3 : separator
4' : first collector     4 : second collector

BATTERY AND CAPACITOR USING QUINOXALINE RESIN

BACKGROUND OF THE INVENTION

The present invention relates to a battery and a capacitor, and more particularly to a battery and a capacitor which has electrodes including a quinoxaline resin, so that the battery and capacitor are highly stable chemically and electrically and also thermally stable and further have high capacitances.

In the prior art, it has been known that a conductive martial film is formed on a surface of the electrode such as in a secondary battery and a capacitor. For the negative electrode or cathode, conductive polymers such as polythiophene, polyacetylene, polyphenylene, polypyridine, are available. In order to display the conductivity of those materials, it is necessary to do either oxidation electrochemistry by doping the material with a p-type dopant or reduction electrochemistry by doping the material with an n-type dopant.

Those processes for oxidation or reduction are, however, complicated and also need to use a corrosiveness oxidizing agent such as iodine. Further, If I−, ClO$_4$− or NR$_4$+(R=alkyl groups) is used as the dopant, the conductive material becomes unstable chemically and physically due to those dopant. As a result, if the above conductive material is used for the electrode, then the capacity is small and cyclic property is unstable.

The above problems are caused by the doping processes, for which reason there has been developed materials usable for the electrode without doping process, for example, N-oxide polyquinolinediil polymers, polyquinoxalinediil, polymers, polypyridinediil polymers. Those conductive polymers are disclosed in Japanese laid-open patent publications No. 9-3171 and No. 9-124777.

In Journal of Electrochemical Society, vol. 140, pp. 2498–2500, 1993, it is disclosed that polyphenylquinoxaline in a concentrated hydrochloric acid solution causes oxidation and reduction reactions as shown in below general formula (1), where choline ions (Cl−) are used as dopant.

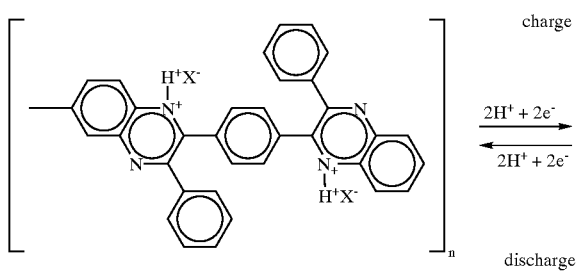

(1)

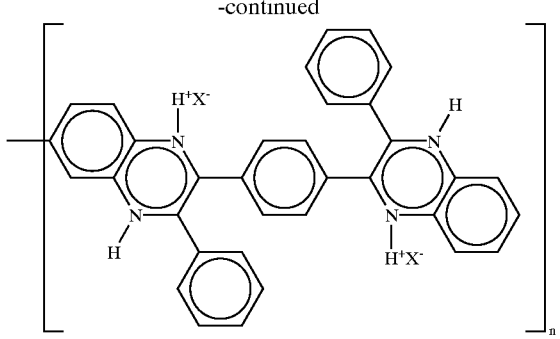

$X^- = Cl^-$ where polymerization degree is at least 5 and X− represents Cl−.

In Journal of Electrochemical Society, vol. 145, pp. 1193–1196, 1998, it is disclosed that polyphenylquinoxaline displays a conductivity in high degree acidic solution, for example, 37%-hydrochloric acid, 70%-nitric acid, 99%-trifluoro sulfuric acid, 96%-sulfuric acid, whereby charge and discharge are caused in the same mechanism as shown in the above general formula. In a concentrated hydrochloric acid, a constant current charge was made to a film containing polyphenylquinoxaline to have confirmed that a capacitance is measured to be 125 mAh/cm$^3$.

The above conductive material, however, has the following problems. The secondary battery using the conductive material has a structure as shown in FIG. 1. A positive electrode (an anode) 2 and a negative electrode (a cathode) 1 are separated by a separator 3. The positive electrode (anode) 2 is in contact with a second collector 4. The negative electrode (cathode) 3 is in contact with a first collector 4'. The positive and negative electrodes may be formed by applying the above conductive materials on the above collectors 4 and 4', respectively. The conductive materials such as polyquinolinediil polymers, polyquinoxalinediil, polymers, polypyridinediil polymers are used for the negative electrode 1.

The above conductive materials such as N-oxide polyquinolinediil polymers, polyquinoxalinediil, polymers, polypyridinediil polymers comprise aromatic heterocyclic compounds which show low reactivity in electrolytic solution and have low capacity and further which are soluble to water or organic solvents. For those reasons, if the above conductive materials are used for the secondary battery, then it is possible that the conductive material is eluted into the electrolytic solution whereby the capacity is remarkably reduced.

Polyphenylquinoxaline as one of the above conductive materials has a large molecular weight of monomer as a unit. Polyphenylquinoxaline is further doped with chlorine ions as dopant as shown in the above general formula (1), wherein only two electrons serve in reaction, for which reason, a capacity per a unit volume or a unit weight is small.

In the above circumstances, it had been required to develop novel electrode, battery and capacitor free from the above problem.

SUMMARY OF THE INVENTION

Accordingly, it is an object of the present invention to provide a novel electrode free from the above problems.

It is a further object of the present invention to provide a novel electrode which is unlikely to be eluted into an electrolytic solution.

It is a still further object of the present invention to provide a novel battery which has a high capacity in a unit volume.

It is yet a further object of the present invention to provide a novel battery which has a high energy efficiency in a unit volume.

It is further more object of the present invention to provide a novel battery which has a high capacity in a unit weight.

It is yet a further object of the present invention to provide a novel battery which has a high energy efficiency in a unit weight.

It is moreover object of the present invention to provide a novel battery which has a high cyclic property.

It is still more object of the present invention to provide a novel capacitor which has a high capacity.

Additionally, it is an object of the present invention to provide a novel method of forming an electrode free from the above problems.

It is a further object of the present invention to provide a novel method of forming an electrode which is unlikely to be eluted into an electrolytic solution.

It is a still further object of the present invention to provide a novel method of forming a battery which has a high capacity in a unit volume.

It is yet a further object of the present invention to provide a novel method of forming a battery which has a high energy efficiency in a unit volume.

It is further more object of the present invention to provide a novel method of forming a battery which has a high capacity in a unit weight.

It is yet a further object of the present invention to provide a novel method of forming a battery which has a high energy efficiency in a unit weight.

It is moreover object of the present invention to provide a novel method of forming a battery which has a high cyclic property.

It is still more object of the present invention to provide a novel method of forming a capacitor which has a high capacity.

The present invention provides an electrode containing a quinoxaline resin and an electrolyte which includes at least one of sulfuric acid ions and sulfonic acid ions, or the electrolyte which includes cations having ion radius of not more than 3 angstroms.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

DISCLOSURE OF THE INVENTION

Figure 1:
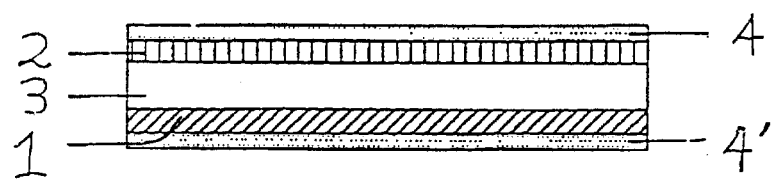
FIG. 1 is a fragmentary cross sectional elevation view illustrative of a secondary battery which may cyclically usable upon charging the battery with an external power.

The first present invention provides an electrode containing a quinoxaline resin and an electrolyte which includes at least one of sulfuric acid ions and sulfonic acid ions, so that sulfuric acid ions or sulfonic acid ions react with nitrogen atoms in quinoxaline rings in the quinoxaline resin, and whereby the number of electrons, which move in the oxidation and reduction reactions, are increased to promote the oxidation and reduction reactions between positive and negative electrodes, thereby allowing the device to have high energy efficiencies in a per unit volume or in a per unit weight, and further allowing the device to have a high capacity in a per unit volume or in a per unit weight.

The second present invention also provides an electrode containing a quinoxaline resin and an electrolyte which includes cations having ion radius of not more than 3 angstroms, so that cations react with nitrogen atoms in quinoxaline rings in the quinoxaline resin, and whereby the number of electrons, which move in the oxidation and reduction reactions, are increased to promote the oxidation and reduction reactions between positive and negative electrodes thereby allowing the device to have high energy efficiencies in a per unit volume or in a per unit weight, and further allowing the device to have a high capacity in a per unit volume or in a per unit weight.

The third present invention provides a battery having at least an electrode containing a quinoxaline resin and an electrolyte which includes at least one of sulfuric acid ions and sulfonic acid ions, so that sulfuric acid ions or sulfonic acid ions react with nitrogen atoms in quinoxaline rings in the quinoxaline resin, and whereby the number of electrons, which move in the oxidation and reduction reactions, are increased to promote the oxidation and reduction reactions between positive and negative electrodes, thereby allowing the battery to have high energy efficiencies in a per unit volume or in a per unit weight, and further allowing the battery to have a high capacity in a per unit volume or in a per unit weight.

The fourth present invention also provides a battery having at least an electrode containing a quinoxaline resin and an electrolyte which includes cations having ion radius of not more than 3 angstroms, so that cations react with nitrogen atoms in quinoxaline rings in the quinoxaline resin, and whereby the number of electrons, which move in the oxidation and reduction reactions, are increased to promote the oxidation and reduction reactions between positive and negative electrodes thereby allowing the battery to have high energy efficiencies in a per unit volume or in a per unit weight, and further allowing the battery to have a high capacity in a per unit volume or in a per unit weight.

The fifth present invention provides a capacitor having at least an electrode containing a quinoxaline resin and an electrolyte which includes at least one of sulfuric acid ions and sulfonic acid ions, so that sulfuric acid ions or sulfonic acid ions react with nitrogen atoms in quinoxaline rings in the quinoxaline resin, and whereby the number of electrons, which move in the oxidation and reduction reactions, are increased to promote the oxidation and reduction reactions between positive and negative electrodes, thereby allowing the capacitor to have high energy efficiencies in a per unit volume or in a per unit weight, and further allowing the capacitor to have a high capacity in a per unit volume or in a per unit weight.

The sixth present invention also provides a capacitor having at least an electrode containing a quinoxaline resin and an electrolyte which includes cations having ion radius of not more than 3 angstroms, so that cations react with nitrogen atoms in quinoxaline rings in the quinoxaline resin, and whereby the number of electrons, which move in the oxidation and reduction reactions, are increased to promote the oxidation and reduction reactions between positive and negative electrodes thereby allowing the capacitor to have high energy efficiencies in a per unit volume or in a per unit weight, and further allowing the capacitor to have a high capacity in a per unit volume or in a per unit weight.

The seventh present invention also provides a method of forming an electrode comprising the steps of: forming a film containing a quinoxaline resin on a surface of a collector; and subjecting said quinoxaline resin to an electrolytic solution containing at least one of sulfuric acid ions and sulfonic acid ions for doping said quinoxaline resin with said electrolytic solution, so that sulfuric acid ions or sulfonic acid ions react with nitrogen atoms in quinoxaline rings in the quinoxaline resin, and whereby the number of electrons, which move in the oxidation and reduction reactions, are increased to promote the oxidation and reduction reactions between positive and negative electrodes, thereby allowing the device to have high energy efficiencies in a per unit volume or in a per unit weight, and further allowing the device to have a high capacity in a per unit volume or in a per unit weight.

The method is also applicable to form a battery or a capacitor. If the method is applied to the battery, sulfuric acid ions or sulfonic acid ions react with nitrogen atoms in quinoxaline rings in the quinoxaline resin, and whereby the number of electrons, which move in the oxidation and reduction reactions, are increased to promote the oxidation and reduction reactions between positive and negative electrodes, thereby allowing the battery to have high energy efficiencies in a per unit volume or in a per unit weight, and further allowing the battery to have a high capacity in a per unit volume or in a per unit weight.

If the method is applied to the capacitor, sulfuric acid ions or sulfonic acid ions react with nitrogen atoms in quinoxaline rings in the quinoxaline resin, and whereby the number of electrons, which move in the oxidation and reduction reactions, are increased to promote the oxidation and reduction reactions between positive and negative electrodes, thereby allowing the capacitor to have high energy efficiencies in a per unit volume or in a per unit weight, and further allowing the capacitor to have a high capacity in a per unit volume or in a per unit weight.

The eighth present invention also provides a method of forming an electrode comprising the steps of: forming a film containing a quinoxaline resin on a surface of a collector; and subjecting said quinoxaline resin to an electrolytic solution which includes cations having ion radius of not more than 3 angstroms for doping said quinoxaline resin with said electrolytic solution, so that cations react with nitrogen atoms in quinoxaline rings in the quinoxaline resin, and whereby the number of electrons, which move in the oxidation and reduction reactions, are increased to promote the oxidation and reduction reactions between positive and negative electrodes thereby allowing the device to have high energy efficiencies in a per unit volume or in a per unit weight, and further allowing the device to have a high capacity in a per unit volume or in a per unit weight.

The above method is also applicable to a battery or a capacitor. If the method is applied to the battery, so that cations react with nitrogen atoms in quinoxaline rings in the quinoxaline resin, and whereby the number of electrons, which move in the oxidation and reduction reactions, are increased to promote the oxidation and reduction reactions between positive and negative electrodes thereby allowing the battery to have high energy efficiencies in a per unit volume or in a per unit weight, and further allowing the capacitor to have a high battery in a per unit volume or in a per unit weight.

If the method is applied to the capacitor, so that cations react with nitrogen atoms in quinoxaline rings in the quinoxaline resin, and whereby the number of electrons, which move in the oxidation and reduction reactions, are increased to promote the oxidation and reduction reactions between positive and negative electrodes thereby allowing the capacitor to have high energy efficiencies in a per unit volume or in a per unit weight, and further allowing the capacitor to have a high capacity in a per unit volume or in a per unit weight.

PREFERRED EMBODIMENT

A first embodiment according to the present invention will be described in detail with reference to the drawings. FIG. 1 is a fragmentary cross sectional elevation view illustrative of a secondary battery which may cyclically usable upon charging the battery with an external power. A positive electrode (an anode) 2 and a negative electrode (a cathode) 1 are separated by a separator 3. The positive electrode (anode) 2 is in contact with a second collector 4. The negative electrode (cathode) 3 is in contact with a first collector 4'. The positive and negative electrodes may be formed by applying the above conductive materials on the above collectors 4 and 4', respectively.

The negative electrode 1 comprises a film which includes a quinoxaline resin and an electrolyte which includes at least one of sulfuric acid ions and sulfonic acid ions. Alternatively, the electrolyte may include cations having ion radius of not more than 3 angstroms. The film of the negative electrode 1 may have a thickness in the range of, for example, 20–500 micrometers, and preferably 50–200 micrometers. The positive electrode 2 may be made of any one of conductive active materials selected in various materials, for example, polymers such as polyaniline, low molecular weight materials, inorganic materials and metals.

The separator 3 may be formed by dipping into a solution solved with the above-described electrolyte or by using a gelled electrolyte or a solid state electrolyte. The solid state electrolyte includes no solvent molecule. The gelled electrolyte may be obtained by plasticization of the solid state electrolyte with an electrolytic solution. The electrolytic solution may be obtained by solving the electrolyte having ion-conductivity without, however, electron-conductivity into an organic solvent or water. Each of the collectors 4 and 4' may comprise a conductive material in the form of a sheet.

The quinoxaline resin may preferably be polyquinoline resins having cyclic units represented by the following general formulae (2) and (3) in view of operability, electronic properties and low hygroscopicity.

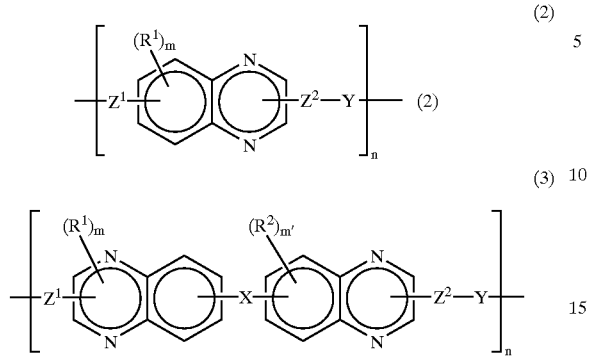

where each of R1 and R2 represents any one of hydrogen atom, halogen atom, hydroxyl groups, sulfon groups, sulfuric acid groups, nitro groups, amino groups, alkyl-thio groups, aryl-thio groups, alkyl groups, aryl groups, alkoxy groups, allyl-oxy groups, holmyl groups (—COH), ketone groups (—$COR^3$), ester groups (—$CO^2R^4$ or —$OCOR^5$), amide groups (—$NR^6COR^7$ or —$CONR^8R^9$) hetero-aryl groups, cyano groups, and divalent hydrocarbon groups which may have unsaturated bonding, where each of R3–R9 represents any one of hydrogen atom, alkyl groups, aryl groups, and hetero-aryl groups, and each of m or m' represents any one of 0, 1, 2, 3, 4 or 5, and X represents any one of the direct chemical bonding without intervening any atoms or molecules, and indirect chemical bonding with intervening atoms or molecules, for example, —O—, —S—, —CO—, —SO—, —$SO_2$—, —A—, —(—O—A—O—)—$_q$, —Q—, —(—A—)—$_r$, where q is the integer of 1–3, r is the integer of 1–500, A represents any one of —$Ar^1$—(arylene groups), —$Hr^1$—(hetero-arylene groups), —$Ar^1$—O—$Ar^1$—, —$Ar^1$—CO—$Ar^1$—, —$Ar^1$—S—Ar—, —$Ar^1$—SO—$Ar^1$—, —$Ar^1$—$SO_2$—$Ar^1$—, —$Ar^1$—Q—$Ar^1$—, where Q is L1—O—L2 where each of L1 and L2 represents any one of methyl groups, trifluoromethyl groups, and divalent hydrocarbon groups which may have unsaturated bonding, and each of Z1 and Z2 represents any one of the direct chemical bonding without intervening any atoms or molecules, and arylene groups, and Y represents any one of the direct chemical bonding without intervening any atoms or molecules, and indirect chemical bonding with intervening atoms or molecules, for example, —O—, and —O—A—O—.

The above alkyl groups may be, for example, methyl groups, ethyl groups, propyl groups, isopropyl groups, n-butyl groups, sec-butyl groups, tert-butyl groups, penthyl groups, cyclopenthyl groups, hexyl groups, cyclohexyl groups, heptyl groups, octyl groups, 2-ethylhexyl groups, decyl groups, undecyl groups, dodecyl groups, or dococyl groups. The above aryl groups may be, for example, phenyl groups, biphenyl groups, naphthyl groups, anthracenyl groups, or diphenyl groups. The above heteroaryl groups may be, for example, pyridyl groups, quinorinidyl, or pyradyl groups. The above arylene groups may be, for example, phenyl groups, biphenyl groups, naphthyl groups, anthracenyl, or diphenyl groups. The above heteroarylene groups may be, for example, polyaniline groups, polypyrrole groups, polythiophene groups, polyphenylenevinylene groups, aryl-thio groups, pyridyl groups, pyrimidyl groups, pyridadyl groups, triadin, quinorinidyl groups, or pyradyl groups.

The above divalent hydrocarbon groups, which may have unsaturated bonding formed by bonding two of R1 and two of R2 as well as two of L1 and two of L2, may be, for example, alkylene groups such as 1,3-propylene groups, 1,4-bytylene groups, 1,5-bentylene groups, given by the following general formula.

—CH=CH—CH=CH—

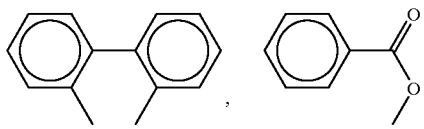

The above quinoxaline resin is a polymer having quinoxaline ring in cyclic units. The polymerization degree of the quinoxaline resin should not be limited provided that the resin may be applied uniformly to form a substantially uniform thickness film. If the polymerization degree of the quinoxaline resin is extremely small, it is possible that the quinoxaline resin is dissolved into the electrolytic solution. It is, for example, preferable that the polymerization degree of the quinoxaline resin is in the range of 25–500, more preferably 50–250. A molecular weight of the quinoxaline resin may be changed in accordance with the object of forming the film or formation conditions. A weight average molecular weight of the quinoxaline resin may be, for example, in the range of 10000–1000000, preferably, 20000–100000. A number average molecular weight of the quinoxaline resin may be, for example, in the range of 3000–100000, preferably, 5000–10000.

The quinoxaline resin may be synthesized in short processes without using an expensive catalyst as disclosed in Journal of Polymer Science vol. 5, 1453–1466, 1967.

The electrode of the present invention contains the above quinoxaline resin and the electrolyte which includes at least one of sulfuric acid ions and sulfonic acid ions or which includes cations having ion radius of not more than 3 angstroms. The electrolyte including sulfuric acid ions is a substance which has a sulfuric acid group and which is dissociated into sulfuric acid ions in an electrolytic solution. Sulfuric acid is one example of the electrolyte including sulfuric acid ions. The electrolyte including sulfonic acid ions is a substance which has a sulfon group and which is dissociated into sulfonic acid ions in an electrolytic solution. Examples of the sulfonic acid ions are organic acids such as benzene sulfonic acid ions, p-toluene sulfonic acid ions, benzene chloride sulfonic acid ions, dodecyl benzene sulfonic acid ions, methane sulfonic acid ions, trifluoromethane sulfonic acid ions, butane sulfonic acid ions, trichlorobenzene sulfonic acid ions, naphthalene sulfonic acid ions, perfluorobutane sulfonic acid ions, perfluorooctane sulfonic acid ions, and polymer acids such as polystyrene sulfonic acid ions, polyvinyl sulfonic acid ions and Nafion®.

The electrolyte including cations having ion radius of not more than 3 angstroms is a substance which is dissociated into cations having ion radius of not more than 3 angstroms in an electrolytic solution. Examples of the electrolyte including cations having ion radius of not more than 3 angstroms are proton, lithium ions, sodium ions, potassium ions, magnesium ions, calcium ions, barium ions, aluminum ions, iron ions, nickel ions, and tetramethylammonium ions.

The method of forming the battery having the above novel negative electrode will be described.

The above novel negative electrode 1 may be formed as follows. A slurry including the quinoxaline resin, a conductive auxiliary substance and methacresol is formed on the collector 4 by use of a doctor blade. After this slurry is dried in vacuum, a press-machine is used to form a film. Subsequently, the film is cut in a predetermined shape thereby forming the negative electrode 1.

The above positive electrode 2 may be formed as follows. A slurry including a conductive active material, a conductive auxiliary substance and a binder resin such as polyvinylidene fluoride is sufficiently stirred and then formed on the collector 4 by use of a doctor blade. After this slurry is dried in vacuum, a press-machine is used to form a film. Subsequently, the film is cut in a predetermined shape thereby forming the positive electrode 2.

Subsequently, an electrolytic solution is prepared, which is dissolved with the electrolyte including at least one of sulfuric acid ions and sulfonic acid ions or including cations having ion radius of not more than 3 angstroms. This electrolytic solution is used for electrochemically or chemically doping the negative and positive electrodes 1 and 2. The separator or gelled electrolyte 3 is immersed with an electrolytic solution. The above negative and positive electrodes 1 and 2 are placed in opposite sides of the separator or gelled electrolyte 3 so that the above negative and positive electrodes 1 and 2 sandwich the separator or gelled electrolyte 3, thereby forming the secondary battery. If the electrolyte includes at least one of sulfuric acid ions and sulfonic acid ions, then this electrolytic solution may be prepared by solving the electrolyte into water. If the electrolyte includes including cations having ion radius of not more than 3 angstroms, then this electrolytic solution may be prepared by solving the electrolyte into an organic solvent. The kind of the electrolyte to be used for preparing the electrolytic solution should not be limited to the above. The kind of the above binder resin should not be limited to polyvinylidene fluoride. Any binder resins, which are unlikely to show corrosion to the electrolytic solution, are available. The kind of the above organic solvent to be used for the above electrolytic solution should not be limited, provided that the electrolyte is dissolved into the organic solvent.

If the doping to the quinoxaline resin is carried out by use of the electrolytic solution dissolved with the electrolyte including at least one of sulfuric acid ions and sulfonic acid ions, then oxidation reduction reactions are caused in ion-neutralized state ($H_3O+HSO_4-$ or $H_3O+SO_3-$) in the electrolytic solution, for which reason the vicinity of the quinoxaline resin is placed into a state in excess of proton, whereby the oxidation and reduction reactions given by the following chemical formulae (4) and (5).

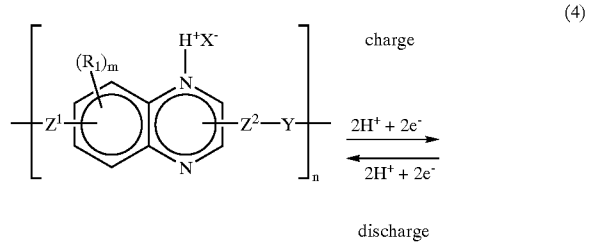

(4)

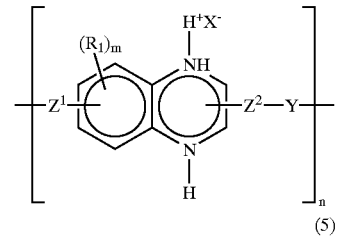

(5)

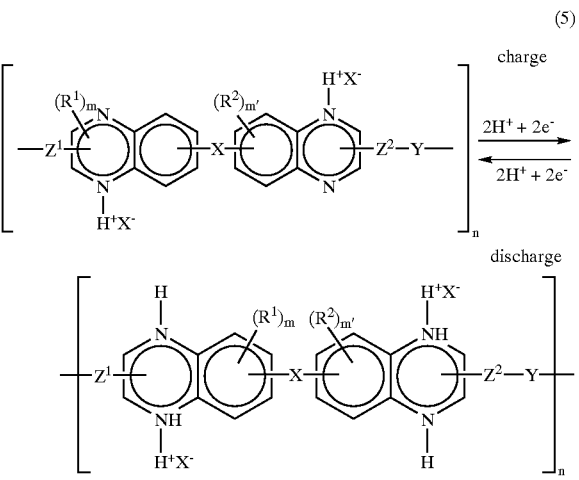

In the above chemical formulae (4) and (5), X represents anions as dopant, for example, organic acid ions such as sulfuric acids ions, benzene sulfonic acid ions, p-toluene sulfonic acid ions, benzene chloride sulfonic acid ions, dodecyl benzene sulfonic acid ions, methane sulfonic acid ions, trifluoromethane sulfonic acid ions, butane sulfonic acid ions, trichlorobenzene sulfonic acid ions, naphthalene sulfonic acid ions, perfluorobutane sulfonic acid ions, perfluorooctane sulfonic acid ions, and polymer acids such as polystyrene sulfonic acid ions, polyvinyl sulfonic acid ions and Nafion®.

In the oxidation and reduction reactions given by the chemical formula (4), two electrons contribute the reaction. In the oxidation and reduction reactions given by the chemical formula (5), four electrons contribute the reaction. A great increase in capacity of the battery can be obtained. Namely, the battery has a high energy efficiency in a unit volume and a high energy efficiency in a unit weight.

In the prior art, chlorine ions (Cl−) are used for dopant and the reactions are shown by the above general formula (1). The number of electrons which contribute the oxidation reduction reactions given by the formulae (4) and (5) is double of the number of electrons which contribute the oxidation reduction reactions given by the formula (1). This causes the great increase in capacity of the novel secondary battery. Namely, the novel secondary battery has a high energy efficiency in a unit volume and a high energy efficiency in a unit weight.

If the doping to the quinoxaline resin is carried out by use of the electrolytic solution prepared by dissolving an organic solvent with the electrolyte including cations having ion radius of not more than 3 angstroms, then at the same time of reaction of anions as dopant to the quinoxaline resin, cations are reacted with nitrogen atoms in the quinoxaline rings in the quinoxaline resin. The reaction mechanisms are shown in the following formulae (6) and (7).

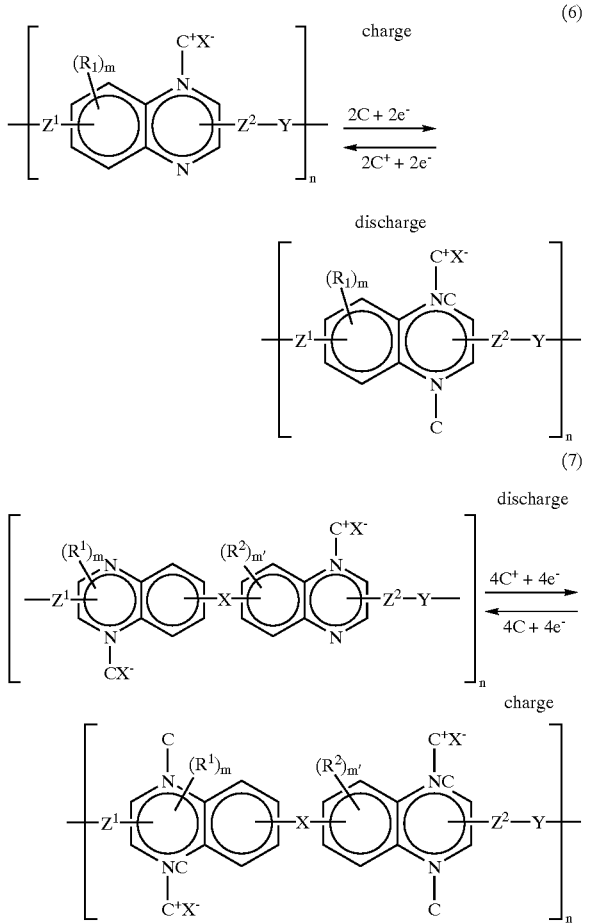

In the above chemical formulae (6) and (7), X represents anions as dopant which is not limited, and C represents an ion having ion radius of not more than 3 angstroms, for example, proton, lithium ions, sodium ions, potassium ions, magnesium ions, calcium ions, barium ions, aluminum ions, iron ions, nickel ions, and tetramethylammonium ions.

If the ion radius were more than 3 angstroms, such large ions prevent cations from approaching in the vicinity of the quinoxaline rings, thereby inhibiting the doping reaction, whereby the reactivity of the oxidation reduction reaction is reduced. In order to prevent this problem, the electrolytic solution containing cations having ion radius of not more than 3 angstroms is used, thereby promoting the doping reaction so that a great increase in capacity can be obtained.

As described above, in accordance with the present invention, the battery has the negative electrode containing a quinoxaline resin and an electrolyte which includes at least one of sulfuric acid ions and sulfonic acid ions, so that sulfuric acid ions or sulfonic acid ions react with nitrogen atoms in quinoxaline rings in the quinoxaline resin, and whereby the number of electrons, which move in the oxidation and reduction reactions, are increased to promote the oxidation and reduction reactions between positive and negative electrodes, thereby allowing the battery to have high energy efficiencies in a per unit volume or in a per unit weight, and further allowing the battery to have a high capacity in a per unit volume or in a per unit weight.

Further, the doping process to the quinoxaline resin activates the oxidation and reduction reactions. The activated oxidation and reduction reactions show high speed reactions, thereby charge and discharge in high rate can be obtained.

Furthermore, the quinoxaline resin is highly stable to the solvent so that almost no elution of the quinoxaline resin to the solvent is caused, whereby an increased adhesiveness between the electrode and the collector can be obtained.

Moreover, the quinoxaline resin has extremely high chemical and electrical stability and a high thermal stability, so that the cyclic property of the battery is improved.

In addition, the doped quinoxaline resin remains stable chemically and electrically, so that a self-discharge efficiency is extremely low, thereby preventing the battery from the self-discharge.

Alternatively, in accordance with the present invention, the battery has the negative electrode containing a quinoxaline resin and an electrolyte which includes cations having ion radius of not more than 3 angstroms, so that cations react with nitrogen atoms in quinoxaline rings in the quinoxaline resin, and whereby the number of electrons, which move in the oxidation and reduction reactions, are increased to promote the oxidation and reduction reactions between positive and negative electrodes, thereby allowing the battery to have high energy efficiencies in a per unit volume or in a per unit weight, and further allowing the battery to have a high capacity in a per unit volume or in a per unit weight.

Further, the doping process to the quinoxaline resin activates the oxidation and reduction reactions. The activated oxidation and reduction reactions show high speed reactions, thereby charge and discharge in high rate can be obtained.

Furthermore, the quinoxaline resin is highly stable to the solvent so that almost no elution of the quinoxaline resin to the solvent is caused, whereby an increased adhesiveness between the electrode and the collector can be obtained.

Moreover, the quinoxaline resin has extremely high chemical and electrical stability and a high thermal stability, so that the cyclic property of the battery is improved.

In addition, the doped quinoxaline resin remains stable chemically and electrically, so that a self-discharge efficiency is extremely low, thereby preventing the battery from the self-discharge.

EXAMPLE 1

Polyphenylquinoxaline shown in the following general formula (8) was used as an active material for forming the negative electrode 1 shown in FIG. 1. Polyaniline shown in the following general formula (9) was used as an active material for forming the positive electrode 2 shown in FIG. 1. The trifluoromethane sulfonic acid was used as dopant to the negative and positive electrodes 1 and 2.

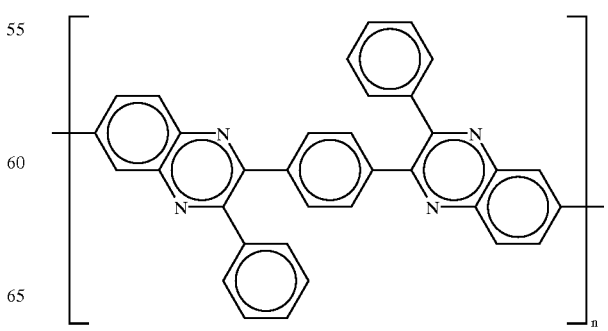

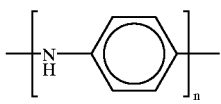
(9)

The positive electrode 2 was prepared. Polyaniline shown in the above general formula (9) was used as an active material. A vapor phase epitaxy carbon as the conductive auxiliary substance was mixed to polyaniline at 4:1 in weight ratio of carbon to polyaniline. Polyvinylidene fluoride having an average molecular weight of 1100 as the binder resin was further added at 8% by weight, in order to obtain a slurry. This slurry was stirred by homogenizer. This slurry was then applied on a main face of the collector 4' by use of the doctor blade, whereby a film was formed on the main face of the collector 4'. The film was then dried in vacuum at 100–150° C. for one hour. Subsequently, the roll-press machine was used to press the film to make the film of 100 micrometers in thickness. The film was then cut to be shaped to form the positive electrode 2.

The negative electrode 1 was prepared. Polyphenyl quinoxaline shown in the above general formula (8) was used as an active material. A vapor phase epitaxy carbon as the conductive auxiliary substance was mixed to polyphenyl quinoxaline at 1:1 in weight ratio of carbon to polyphenyl quinoxaline. Matacresol was further added at room temperature, in order to obtain a slurry. This slurry was then applied on a main face of the collector 4 by use of the doctor blade, whereby a film was formed on the main face of the collector 4'. The film was then dried in vacuum at 100–150° C. for one hour and thereafter an anneal was carried out. Subsequently, the roll-press machine was used to press the film to make the film of 100 micrometers in thickness. The film was then cut to be shaped to form the negative electrode 1.

A trifluoromethane sulfonic acid solution was used for subjecting the negative and positive electrodes 1 and 2 to the electrochemical or chemical doping. The doped negative and positive electrodes 1 and 2 were placed in opposite sides of the separator 3 immersed with the electrolytic solution, whereby to obtain the secondary battery.

The secondary battery was charged to measure various characteristics thereof. The secondary battery was charged in the range of 1–10C up to 0.9V at a constant current in the range of 1–10 mA/cm2, where a theoretical capacity was 198 Wh/kg per the weight of the negative active material, for example, polyphenyl quinoxaline. The actual capacity did not depend upon the discharge rate and was 135 Wh/kg per the weight of the negative active material. A ratio of the actual capacity to the theoretical capacity was high, for example, 68%. The cyclic characteristics were also measured A cyclic number necessary for dropping the capacity to 80% of the initial capacity of 135 Wh/kg was 9000. A capacity storage characteristic was also measured. After the battery was placed at 25° C. for 30 days, then the capacity was reduced to 80% of the initial capacity. Namely, the capacity showed such the characteristics as a lithium ion battery or a nickel hydrogen battery.

The reaction mechanism of polyphenyl quinoxaline was as shown in the following formula (10), wherein four electrons contribute to promote the reactions, whereby a great improvement in capacity of the battery can be obtained. Namely, there was obtained the battery which has a high energy efficiency in a unit volume and a high energy efficiency in a unit weight.

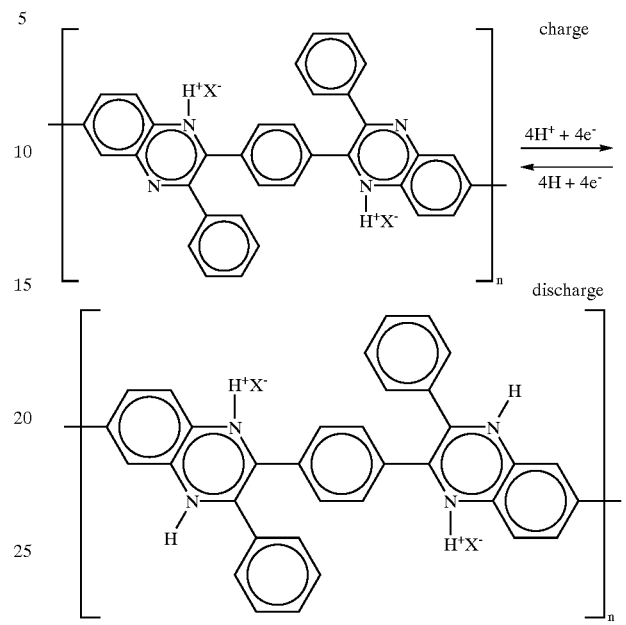
(10)

In this example, the trifluoromethane sulfonic acid solution was used as the electrolytic solution. However, other electrolytic solution may be used. Polyvinylidene fluoride was used as the binder resin. Other binder resins showing no corrosion to the electrolytic solution may be available.

EXAMPLE 2

In this example, the polyvinyl sulfonic acid was used as a dopant to the negative and positive electrodes 1 and 2.

Similarly to Example 1, polyphenyl quinoxaline was used as an active material for forming the negative electrode 1 shown in FIG. 1. Polyaniline was used as an active material for forming the positive electrode 2 shown in FIG. 1. The polyvinyl sulfonic acid was used as dopant to the negative and positive electrodes 1 and 2.

The positive electrode 2 was prepared in the same manner as in Example 1. Polyaniline shown in the above general formula (9) was used as an active material. A vapor phase epitaxy carbon as the conductive auxiliary substance was mixed to polyaniline at 4:1 in weight ratio of carbon to polyaniline. Polyvinylidene fluoride having an average molecular weight of 1100 as the binder resin was further added at 8% by weight, in order to obtain a slurry. This slurry was stirred by homogenizer. This slurry was then applied on a main face of the collector 4' by use of the doctor blade, whereby a film was formed on the main face of the collector 4'. The film was then dried in vacuum at 100–150° C. for one hour. Subsequently, the roll-press machine was used to press the film to make the film of 100 micrometers in thickness. The film was then cut to be shaped to form the positive electrode 2.

The negative electrode 1 was prepared in the same manner as in Example 1. Polyphenyl quinoxaline shown in the above general formula (8) was used as an active material. A vapor phase epitaxy carbon as the conductive auxiliary substance was mixed to polyphenyl quinoxaline at 1:1 in weight ratio of carbon to polyphenyl quinoxaline. Matacresol was further added at room temperature, in order to obtain a slurry. This slurry was then applied on a main face of the collector 4 by use of the doctor blade, whereby a film was formed on the main face of the collector 4'. The film was then dried in vacuum at 100–150° C. for one hour and thereafter an anneal was carried out. Subsequently, the roll-press machine was used to press the film to make the film of 100 micrometers in thickness. The film was then cut to be shaped to form the negative electrode 1.

A polyvinyl sulfonic acid solution was used for subjecting the negative and positive electrodes 1 and 2 to the electrochemical or chemical doping. The doped negative and positive electrodes 1 and 2 were placed in opposite sides of the separator 3 immersed with the electrolytic solution, whereby to obtain the secondary battery.

The secondary battery was charged to measure various characteristics thereof. The secondary battery was charged in the range of 1–10C up to 0.9V at a constant current in the range of 1–10 mA/cm2, where a theoretical capacity was 198 Wh/kg per the weight of the negative active material, for example, polyphenyl quinoxaline. The actual capacity did not depend upon the discharge rate and was 160 Wh/kg per the weight of the negative active material. A ratio of the actual capacity to the theoretical capacity was high, for example, 81%. The cyclic characteristics were also measured. A cyclic number necessary for dropping the capacity to 80% of the initial capacity of 160 Wh/kg was 11000. A capacity storage characteristic was also measured. After the battery was placed at 25° C. for 30 days, then the capacity was reduced to 80% of the initial capacity. Namely, the capacity showed such the characteristics as a lithium ion battery or a nickel hydrogen battery.

The reaction mechanism of polyphenyl quinoxaline was as shown in the above formula (10), wherein four electrons contribute to promote the reactions, whereby a great improvement in capacity of the battery can be obtained. Namely, there was obtained the battery which has a high energy efficiency in a unit volume and a high energy efficiency in a unit weight.

In this example, the polyvinyl sulfonic acid solution was used as the electrolytic solution. However, other electrolytic solution may be used. The use of polymer dopant causes a further increase in concentration of proton around polyphenyl quinoxaline whereby the reactivity was increased and the high capacity was obtained. The use of polymer dopant prevents de-doping whereby the cyclic property was improved.

EXAMPLE 3

In this example, a sulfuric acid having sulfuric acid groups was used as a dopant to the negative and positive electrodes 1 and 2.

Similarly to Example 1, polyphenyl quinoxaline was used as an active material for forming the negative electrode 1 shown in FIG. 1. Polyaniline was used as an active material for forming the positive electrode 2 shown in FIG. 1. The sulfuric acid was used as dopant to the negative and positive electrodes 1 and 2.

The positive electrode 2 was prepared in the same manner as in Example 1. Polyaniline shown in the above general formula (9) was used as an active material. A vapor phase epitaxy carbon as the conductive auxiliary substance was mixed to polyaniline at 4:1 in weight ratio of carbon to polyaniline. Polyvinylidene fluoride having an average molecular weight of 1100 as the binder resin was further added at 8% by weight, in order to obtain a slurry. This slurry was stirred by homogenizer. This slurry was then applied on a main face of the collector 4' by use of the doctor blade, whereby a film was formed on the main face of the collector 4'. The film was then dried in vacuum at 100–150° C. for one hour. Subsequently, the roll-press machine was used to press the film to make the film of 100 micrometers in thickness. The film was then cut to be shaped to form the positive electrode 2.

The negative electrode 1 was prepared in the same manner as in Example 1. Polyphenyl quinoxaline shown in the above general formula (8) was used as an active material. A vapor phase epitaxy carbon as the conductive auxiliary substance was mixed to polyphenyl quinoxaline at 1:1 in weight ratio of carbon to polyphenyl quinoxaline. Matacresol was further added at room temperature, in order to obtain a slurry. This slurry was then applied on a main face of the collector 4 by use of the doctor blade, whereby a film was formed on the main face of the collector 4'. The film was then dried in vacuum at 100–150° C. for one hour and thereafter an anneal was carried out. Subsequently, the roll-press machine was used to press the film to make the film of 100 micrometers in thickness. The film was then cut to be shaped to form the negative electrode 1.

A sulfuric acid solution was used for subjecting the negative and positive electrodes 1 and 2 to the electrochemical or chemical doping. The doped negative and positive electrodes 1 and 2 were placed in opposite sides of the separator 3 immersed with the electrolytic solution, whereby to obtain the secondary battery.

The secondary battery was charged to measure various characteristics. thereof. The secondary battery was charged in the range of 1–10C up to 0.9V at a constant current in the range of 1–10 mA/cm2, where a theoretical capacity was 198 Wh/kg per the weight of the negative active material, for example, polyphenyl quinoxaline. The actual capacity did not depend upon the discharge rate and was 170 Wh/kg per the weight of the negative active material. A ratio of the actual capacity to the theoretical capacity was high, for example, 86%. The cyclic characteristics were also measured. A cyclic number necessary for dropping the capacity to 80% of the initial capacity of 170 Wh/kg was 9000. A capacity storage characteristic was also measured. After the battery was placed at 25° C. for 30 days, then the capacity was reduced to 80% of the initial capacity. Namely, the capacity showed such the characteristics as a lithium ion battery or a nickel hydrogen battery.

The reaction mechanism of polyphenyl quinoxaline was as shown in the above formula (10), wherein four electrons contribute to promote the reactions, whereby a great improvement in capacity of the battery can be obtained. Namely, there was obtained the battery which has a high energy efficiency in a unit volume and a high energy efficiency in a unit weight.

In this example, the sulfuric acid solution was used as the electrolytic solution. However, other electrolytic solution may be used. The use of polymer dopant causes a further increase in concentration of proton around polyphenyl quinoxaline whereby the reactivity was increased and the high capacity was obtained. The use of polymer dopant prevents de-doping whereby the cyclic property was improved.

EXAMPLE 4

In this example, a lithium trifluoromethane sulfonic acid was used as a dopant to the negative and positive electrodes 1 and 2. PC/EC mixing solvent was used for the electrolytic solution.

Similarly to Example 1, polyphenyl quinoxaline was used as an active material for forming the negative electrode 1 shown in FIG. 1. Polyaniline was used as an active material for forming the positive electrode 2 shown in FIG. 1. The lithium trifluoromethane sulfonic acid was used as dopant to the negative and positive electrodes 1 and 2.

The positive electrode 2 was prepared in the same manner as in Example 1. Polyaniline shown in the above general formula (9) was used as an active material. A vapor phase epitaxy carbon as the conductive auxiliary substance was mixed to polyaniline at 4:1 in weight ratio of carbon to polyaniline. Polyvinylidene fluoride having an average molecular weight of 1100 as the binder resin was further added at 8% by weight, in order to obtain a slurry. This slurry was stirred by homogenizer. This slurry was then applied on a main face of the collector 4' by use of the doctor blade, whereby a film was formed on the main face of the collector 4'. The film was then dried in vacuum at 100–150° C. for one hour. Subsequently, the roll-press machine was used to press the film to make the film of 100 micrometers in thickness. The film was then cut to be shaped to form the positive electrode 2.

The negative electrode 1 was prepared in the same manner as in Example 1. Polyphenyl quinoxaline shown in the above general formula (8) was used as an active material. A vapor phase epitaxy carbon as the conductive auxiliary substance was mixed to polyphenyl quinoxaline at 1:1 in weight ratio of carbon to polyphenyl quinoxaline. Mata-cresol was further added at room temperature, in order to obtain a slurry. This slurry was then applied on a main face of the collector 4 by use of the doctor blade, whereby a film was formed on the main face of the collector 4'. The film was then dried in vacuum at 100–150° C. for one hour and thereafter an anneal was carried out. Subsequently, the roll-press machine was used to press the film to make the film of 100 micrometers in thickness. The film was then cut to be shaped to form the negative electrode 1.

A lithium trifluoromethane sulfonic acid solution was used for subjecting the negative and positive electrodes 1 and 2 to the electrochemical or chemical doping. The doped negative and positive electrodes 1 and 2 were placed in opposite sides of the separator 3 immersed with the electrolytic solution, whereby to obtain the secondary battery.

The secondary battery was charged to measure various characteristics thereof. The secondary battery was charged in the range of 1–10C up to 2.2V at a constant current in the range of 1–10 mA/cm2, where a theoretical capacity was 484 Wh/kg per the weight of the negative active material, for example, polyphenyl quinoxaline. The actual capacity did not depend upon the discharge rate and was 330 Wh/kg per the weight of the negative active material. A ratio of the actual capacity to the theoretical capacity was high, for example, 68%. The cyclic characteristics were also measured. A cyclic number necessary for dropping the capacity to 80% of the initial capacity of 330 Wh/kg was 7000. A capacity storage characteristic was also measured. After the battery was placed at 25° C. for 30 days, then the capacity was reduced to 80% of the initial capacity. Namely, the capacity showed such the characteristics as a lithium ion battery or a nickel hydrogen battery.

A great improvement in capacity of the battery can be obtained. Namely, there was obtained the battery which has a high energy efficiency in a unit volume and a high energy efficiency in a unit weight.

In his example, the lithium trifluoromethane sulfonic acid solution was used as the dopant. PC/EC mixing organic solvent was used for the electrolytic solution. However, other electrolytic solution may be used. The use of organic solvent for the electrolytic solution causes the increase in electromotive force and also the increase in energy density of the capacitor. It is not necessary to limit the above PC/EC mixing solvent for the electrolytic solution.

EXAMPLE 5

In this example, lithium perchlorate was used as a dopant to the negative and positive electrodes 1 and 2. PC/EC mixing solvent was used for the electrolytic solution.

Similarly to Example 1, polyphenyl quinoxaline was used as an active material for forming the negative electrode 1 shown in FIG. 1. Polyaniline was used as an active material for forming the positive electrode 2 shown in FIG. 1. The lithium trifluoromethane sulfonic acid was used as dopant to the negative and positive electrodes 1 and 2.

The positive electrode 2 was prepared in the same manner as in Example 1. Polyaniline shown in the above general formula (9) was used as an active material. A vapor phase epitaxy carbon as the conductive auxiliary substance was mixed to polyaniline at 4:1 in weight ratio of carbon to polyaniline. Polyvinylidene fluoride having an average molecular weight of 1100 as the binder resin was further added at 8% by weight, in order to obtain a slurry. This slurry was stirred by homogenizer. This slurry was then applied on a main face of the collector 4' by use of the doctor blade, whereby a film was formed on the main face of the collector 4'. The film was then dried in vacuum at 100–150° C. for one hour. Subsequently, the roll-press machine was used to press the film to make the film of 100 micrometers in thickness. The film was then cut to be shaped to form the positive electrode 2.

The negative electrode 1 was prepared in the same manner as in Example 1. Polyphenyl quinoxaline shown in the above general formula (8) was used as an active material. A vapor phase epitaxy carbon as the conductive auxiliary substance was mixed to polyphenyl quinoxaline at 1:1 in weight ratio of carbon to polyphenyl quinoxaline. Mata-cresol was further added at room temperature, in order to obtain a slurry. This slurry was then applied on a main face of the collector 4 by use of the doctor blade, whereby a film was formed on the main face of the collector 4'. The film was then dried in vacuum at 100–150° C. for one hour and thereafter an anneal was carried out. Subsequently, the roll-press machine was used to press the film to make the film of 100 micrometers in thickness. The film was then cut to be shaped to form the negative electrode 1.

A lithium perchlorate solution was used for subjecting the negative and positive electrodes 1 and 2 to the electrochemical or chemical doping. The doped negative and positive electrodes 1 and 2 were placed in opposite sides of the separator 3 immersed with the electrolytic solution, whereby to obtain the secondary battery.

The secondary battery was charged to measure various characteristics thereof. The secondary battery was charged in the range of 1–10C up to 2.2V at a constant current in the range of 1–10 mA/cm2, where a theoretical capacity was 484 Wh/kg per the weight of the negative active material, for example, polyphenyl quinoxaline. The actual capacity did not depend upon the discharge rate and was 354 W/kg per the weight of the negative active material. A ratio of the actual capacity to the theoretical capacity was high, for example, 73%. The cyclic characteristics were also measured. A cyclic number necessary for dropping the capacity to 80% of the initial capacity of 354 Wh/kg was 7000. A capacity storage characteristic was also measured. After the battery was placed at 25° C. for 30 days, then the capacity was reduced to 80% of the initial capacity. Namely, the capacity showed such the characteristics as a lithium ion battery or a nickel hydrogen battery.

A great improvement in capacity of the battery can be obtained. Namely, there was obtained the battery, which has a high energy efficiency in a unit volume and a high energy efficiency in a unit weight.

In this example, the lithium perchlorate as acid was used to increase the ion-conductivity so as to allow high rate charge and discharge. PC/EC mixing organic solvent was used for the electrolytic solution. However, other electrolytic solution may be used. The use of organic solvent for the electrolytic solution causes the increase in electromotive force and also the increase in energy density of the capacitor. It is not necessary to limit the above PC/EC mixing solvent for the electrolytic solution.

COMPARATIVE EXAMPLE 1

In this comparative example, in place of trifluoromethane sulfonic acid used in Example 1, a phosphoric acid was used as a dopant to the negative and positive electrodes 1 and 2.

Similarly to Example 1, polyphenyl quinoxaline was used as an active material for forming the negative electrode 1 shown in FIG. 1. Polyaniline was used as an active material for forming the positive electrode 2 shown in FIG. 1. The phosphoric acid was used as dopant to the negative and positive electrodes 1 and 2.

The positive electrode 2 was prepared in the same manner as in Example 1. Polyaniline shown in the above general formula (9) was used as an active material. A vapor phase epitaxy carbon as the conductive auxiliary substance was mixed to polyaniline at 4:1 in weight ratio of carbon to polyaniline. Polyvinylidene fluoride having an average molecular weight of 1100 as the binder resin was further added at 8% by weight, in order to obtain a slurry. This slurry was stirred by homogenizer. This slurry was then applied on a main face of the collector 4' by use of the doctor blade, whereby a film was formed on the main face of the collector 4'. The film was then dried in vacuum at 100–150° C. for one hour. Subsequently, the roll-press machine was used to press the film to make the film of 100 micrometers in thickness. The film was then cut to be shaped to form the positive electrode 2.

The negative electrode 1 was prepared in the same manner as in Example 1. Polyphenyl quinoxaline shown in the above general formula (8) was used as an active material. A vapor phase epitaxy carbon as the conductive auxiliary substance was mixed to polyphenyl quinoxaline at 1:1 in weight ratio of carbon to polyphenyl quinoxaline. Mata-cresol was further added at room temperature, in order to obtain a slurry. This slurry was then applied on a main face of the collector 4 by use of the doctor blade, whereby a film was formed on the main face of the collector 4'. The film was then dried in vacuum at 100–150° C. for one hour and thereafter an anneal was carried out. Subsequently, the roll-press machine was used to press the film to make the film of 100 micrometers in thickness. The film was then cut to be shaped to form the negative electrode 1.

A phosphoric acid solution was used for subjecting the negative and positive electrodes 1 and 2 to the electrochemical or chemical doping. The doped negative and positive electrodes 1 and 2 were placed in opposite sides of the separator 3 immersed with the electrolytic solution, whereby to obtain the secondary battery.

The secondary battery was charged to measure various characteristics thereof. The secondary battery was charged in the range of 1–10C up to 0.9V at a constant current in the range of 1–10 mA/cm2, where a theoretical capacity was 198 Wh/kg per the weight of the negative active material, for example, polyphenyl quinoxaline. The actual capacity did not depend upon the discharge rate and was 50 Wh/kg per the weight of the negative active material. A ratio of the actual capacity to the theoretical capacity was high, for example, 25%. The cyclic characteristics were also measured. A cyclic number necessary for dropping the capacity to 80% of the initial capacity of 50 Wh/kg was 9000. A capacity storage characteristic was also measured. After the battery was placed at 25° C. for 30 days, then the capacity was reduced to 80% of the initial capacity.

COMPARATIVE EXAMPLE 2

In this comparative example, in place of trifluoromethane sulfonic acid used in Example 1, a trifluoroacetic acid was used as a dopant to the negative and positive electrodes 1 and 2.

Similarly to Example 1, polyphenyl quinoxaline was used as an active material for forming the negative electrode 1 shown in FIG. 1. Polyaniline was used as an active material for forming the positive electrode 2 shown in FIG. 1. The trifluoroacetic acid was used as dopant to the negative and positive electrodes 1 and 2.

The positive electrode 2 was prepared in the same manner as in Example 1. Polyaniline shown in the above general formula (9) was used as an active material. A vapor phase epitaxy carbon as the conductive auxiliary substance was mixed to polyaniline at 4:1 in weight ratio of carbon to polyaniline. Polyvinylidene fluoride having an average molecular weight of 1100 as the binder resin was further added at 8% by weight, in order to obtain a slurry. This slurry was stirred by homogenizer. This slurry was then applied on a main face of the collector 4' by use of the doctor blade, whereby a film was formed on the main face of the collector 4'. The film was then dried in vacuum at 100–150° C. for one hour. Subsequently, the roll-press machine was used to press the film to make the film of 100 micrometers in thickness. The film was then cut to be shaped to form the positive electrode 2.

The negative electrode 1 was prepared in the same manner as in Example 1. Polyphenyl quinoxaline shown in the above general formula (8) was used as an active material. A vapor phase epitaxy carbon as the conductive auxiliary substance was mixed to polyphenyl quinoxaline at 1:1 in weight ratio of carbon to polyphenyl quinoxaline. Mata-cresol was further added at room temperature, in order to obtain a slurry. This slurry was then applied on a main face of the collector 4 by use of the doctor blade, whereby a film was formed on the main face of the collector 4'. The film was then dried in vacuum at 100–150° C. for one hour and thereafter an anneal was carried out. Subsequently, the roll-press machine was used to press the film to make the film of 100 micrometers in thickness. The film was then cut to be shaped to form the negative electrode 1.

A trifluoroacetic acid solution was used for subjecting the negative and positive electrodes 1 and 2 to the electrochemical or chemical doping. The doped negative and positive electrodes 1 and 2 were placed in opposite sides of the separator 3 immersed with the electrolytic solution, whereby to obtain the secondary battery.

The secondary battery was charged to measure various characteristics thereof. The secondary battery was charged in the range of 1–10C up to 0.9V at a constant current in the range of 1–10 mA/cm2, where a theoretical capacity was 198 Wh/kg per the weight of the negative active material, for example, polyphenyl quinoxaline. The actual capacity did not depend upon the discharge rate and was 60 Wh/kg per the weight of the negative active material. A ratio of the actual capacity to the theoretical capacity was high, for example, 30%. The cyclic characteristics were also measured. A cyclic number necessary for dropping the capacity to 80% of the initial capacity of 60 W/kg was 5000. A capacity storage characteristic was also measured. After the battery was placed at 25° C. for 1 hour, then the capacity was reduced to 20% of the initial capacity.

COMPARATIVE EXAMPLE 3

In this comparative example, in place of trifluoromethane sulfonic acid used in Example 1, a hydrochloric acid was used as a dopant to the negative and positive electrodes 1 and 2.

Similarly to Example 1, polyphenyl quinoxaline was used as an active material for forming the negative electrode 1 shown in FIG. 1. Polyaniline was used as an active material for forming the positive electrode 2 shown in FIG. 1. The hydrochloric acid was used as dopant to the negative and positive electrodes 1 and 2.

The positive electrode 2 was prepared in the same manner as in Example 1. Polyaniline shown in the above general formula (9) was used as an active material. A vapor phase epitaxy carbon as the conductive auxiliary substance was mixed to polyaniline at 4:1 in weight ratio of carbon to polyaniline. Polyvinylidene fluoride having an average molecular weight of 1100 as the binder resin was further added at 8% by weight, in order to obtain a slurry. This slurry was stirred by homogenizer. This slurry was then applied on a main face of the collector 4' by use of the doctor blade, whereby a film was formed on the main face of the collector 4'. The film was then dried in vacuum at 100–150° C. for one hour. Subsequently, the roll-press machine was used to press the film to make the film of 100 micrometers in thickness. The film was then cut to be shaped to form the positive electrode 2.

The negative electrode 1 was prepared in the same manner as in Example 1. Polyphenyl quinoxaline shown in the above general formula (8) was used as an active material. A vapor phase epitaxy carbon as the conductive auxiliary substance was mixed to polyphenyl quinoxaline at 1:1 in weight ratio of carbon to polyphenyl quinoxaline. Matacresol was further added at room temperature, in order to obtain a slurry. This slurry was then applied on a main face of the collector 4 by use of the doctor blade, whereby a film was formed on the main face of the collector 4'. The film was then dried in vacuum at 100–150° C. for one hour and thereafter an anneal was carried out. Subsequently, the roll-press machine was used to press the film to make the film of 100 micrometers in thickness. The film was then cut to be shaped to form the negative electrode 1.

A hydrochloric acid solution was used for subjecting the negative and positive electrodes 1 and 2 to the electrochemical or chemical doping. The doped negative and positive electrodes 1 and 2 were placed in opposite sides of the separator 3 immersed with the electrolytic solution, whereby to obtain the secondary battery.

The secondary battery was charged to measure various characteristics thereof. The secondary battery was charged in the range of 1–10C up to 0.9V at a constant current in the range of 1–10 mA/cm2, where a theoretical capacity was 198 Wh/kg per the weight of the negative active material, for example, polyphenyl quinoxaline. The actual capacity did not depend upon the discharge rate and was 90 Wh/kg per the weight of the negative active material. A ratio of the actual capacity to the theoretical capacity was high, for example, 45%. The cyclic characteristics were also measured. A cyclic number necessary for dropping the capacity to 80% of the initial capacity of 90 Wh/kg was 1000. A capacity storage characteristic was also measured After the battery was placed at 25° C. for 1 hour, then the capacity was reduced to 20% of the initial capacity.

COMPARATIVE EXAMPLE 4

In this comparative example, in place of lithium perchlorate used in Example 5, tetramethylammonium tetrafluoroborate was used as a dopant to the negative and positive electrodes 1 and 2. PC/EC mixing solvent was used for the electrolytic solution.

Similarly to Example 1, polyphenyl quinoxaline was used as an active material for forming the negative electrode 1 shown in FIG. 1. Polyaniline was used as an active material for forming the positive electrode 2 shown in FIG. 1. Ttetraethylammonium tetrafluoroborate was used as dopant to the negative and positive electrodes 1 and 2.

The positive electrode 2 was prepared in the same manner as in Example 1. Polyaniline shown in the above general formula (9) was used as an active material. A vapor phase epitaxy carbon as the conductive auxiliary substance was mixed to polyaniline at 4:1 in weight ratio of carbon to polyaniline. Polyvinylidene fluoride having an average molecular weight of 1100 as the binder resin was further added at 8% by weight, in order to obtain a slurry. This slurry was stirred by homogenizer. This slurry was then applied on a main face of the collector 4' by use of the doctor blade, whereby a film was formed on the main face of the collector 4'. The film was then dried in vacuum at 100–150° C. for one hour. Subsequently, the roll-press machine was used to press the film to make the film of 100 micrometers in thickness. The film was then cut to be shaped to form the positive electrode 2.

The negative electrode 1 was prepared in the same manner as in Example 1. Polyphenyl quinoxaline shown in the above general formula (8) was used as an active material. A vapor phase epitaxy carbon as the conductive auxiliary substance was mixed to polyphenyl quinoxaline at 1:1 in weight ratio of carbon to polyphenyl quinoxaline. Matacresol was further added at room temperature, in order to obtain a slurry. This slurry was then applied on a main face of the collector 4 by use of the doctor blade, whereby a film was formed on the main face of the collector 4'. The film was then dried in vacuum at 100–150° C. for one hour and thereafter an anneal was carried out. Subsequently, the roll-press machine was used to press the film to make the film of 100 micrometers in thickness. The film was then cut to be shaped to form the negative electrode 1.

A tetraethylammonium tetrafluoroborate solution was used for subjecting the negative and positive electrodes 1 and 2 to the electrochemical or chemical doping. The doped negative and positive electrodes 1 and 2 were placed in opposite sides of the separator 3 immersed with the electrolytic solution, whereby to obtain the secondary battery.

The secondary battery was charged to measure various characteristics thereof. The secondary battery was charged in the range of 1–10C up to 2.2V at a constant current in the range of 1–10 mA/cm2, where a theoretical capacity was 484 Wh/kg per the weight of the negative active material, for example, polyphenyl quinoxaline. The actual capacity did not depend upon the discharge rate and was 100 Wh/kg per the weight of the negative active material. A ratio of the actual capacity to the theoretical capacity was high, for example, 21%. The cyclic characteristics were also measured. A cyclic number necessary for dropping the capacity to 80% of the initial capacity of 484 Wh/kg was 7000. A capacity storage characteristic was also measured. After the battery was placed at 25° C. for 30 days, then the capacity was reduced to 80% of the initial capacity.

The following table 1 shows characteristics of the batteries of Examples 1–5, and Comparative Examples 1–4.

TABLE 1

| | anion (dopant) | cation | electrolytic solution | voltage (V) | capacity (Wh/kg) | | cyclic property (80%) | | |
|---|---|---|---|---|---|---|---|---|---|
| | | | | | 1 C | 10 C | 25° C. | 40° C. | 65° C. |
| Ex. 1 | CF3SO3 | H+ | water | 0.9 | 135 | 130 | 9000 | 8000 | 5000 |
| Ex. 2 | PVSA | H+ | water | 0.9 | 160 | 155 | 11000 | 10000 | 8000 |
| Ex. 3 | HOS1 or SO1$^2$ | H+ | water | 0.9 | 170 | 155 | 9000 | 8000 | 5000 |
| Ex. 4 | CF3SO3 | Li+ | PC/EC | 2.2 | 330 | 300 | 7000 | 6000 | 4000 |
| Ex. 5 | C1O4 | Li+ | PC/EC | 2.2 | 345 | 330 | 7000 | 6000 | 4000 |
| Co. 1 | H2PO4 | H+ | water | 0.9 | 50 | 45 | 9000 | 8000 | 5000 |
| Co. 2 | CF3CO2 | H+ | water | 0.9 | 60 | 55 | 5000 | 2500 | 1000 |
| Co. 3 | C1 | H+ | water | 0.9 | 90 | 85 | 1000 | 500 | 100 |
| Co. 4 | BF1 | Et1N | PC/EC | 2.2 | 100 | 70 | 7000 | 6000 | 4000 |

Figure 2:
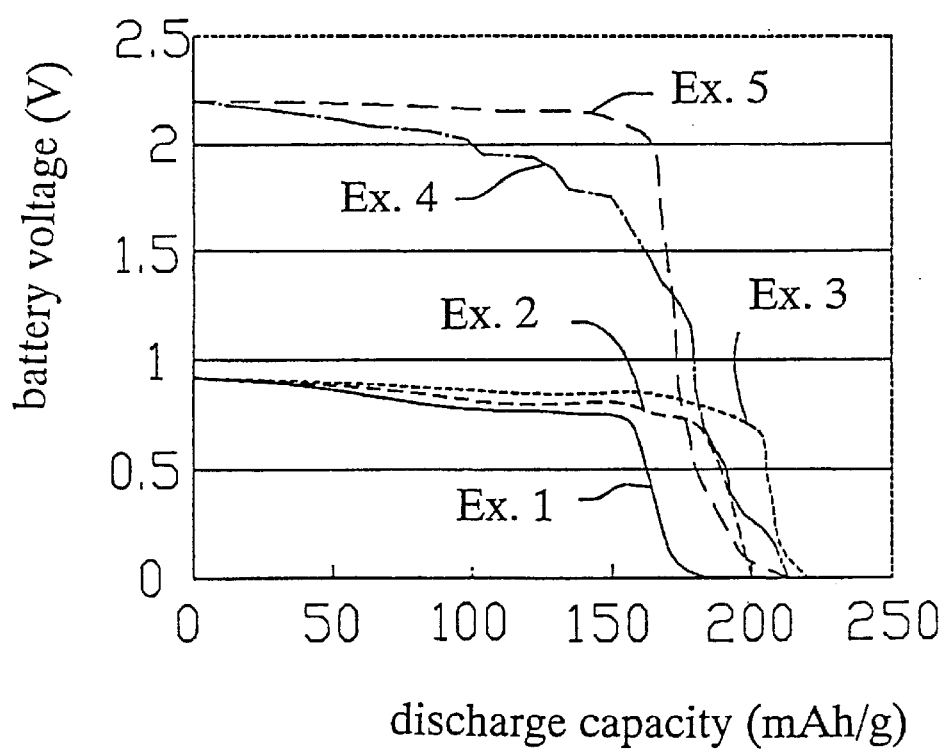
FIG. 2 is a diagram illustrative of variations in voltage provided by batteries of Examples 1–5 versus discharge capacity wherein a discharge current is fixed at 1 mA/cm$^2$.
Figure 3:
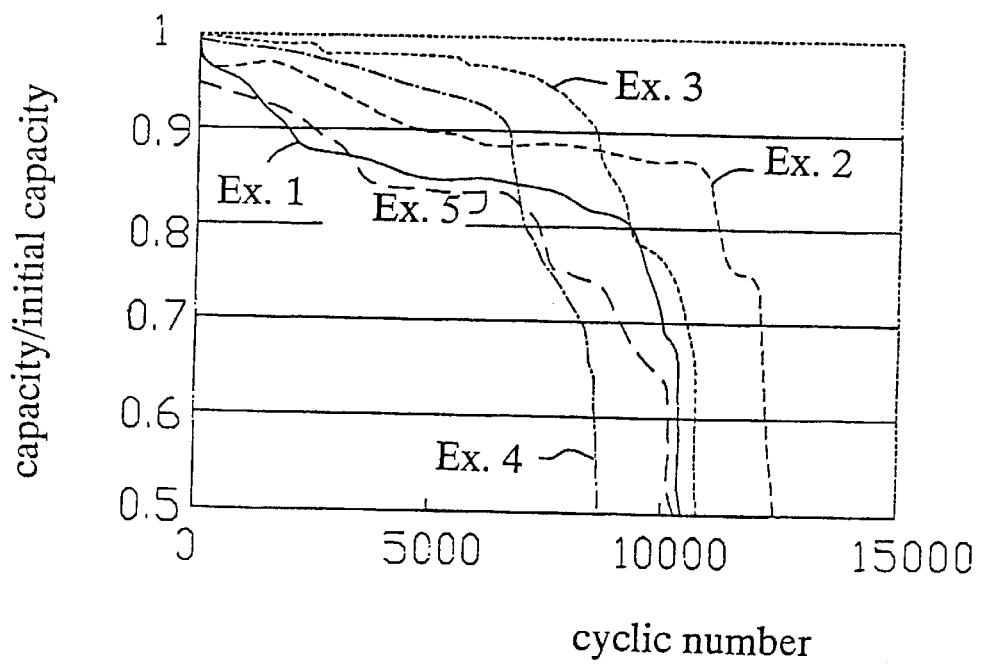
FIG. 3 is a diagram illustrative of variations in ratio of capacity to initial capacity of batteries of Examples 1–5 versus cycle number.
Figure 4:
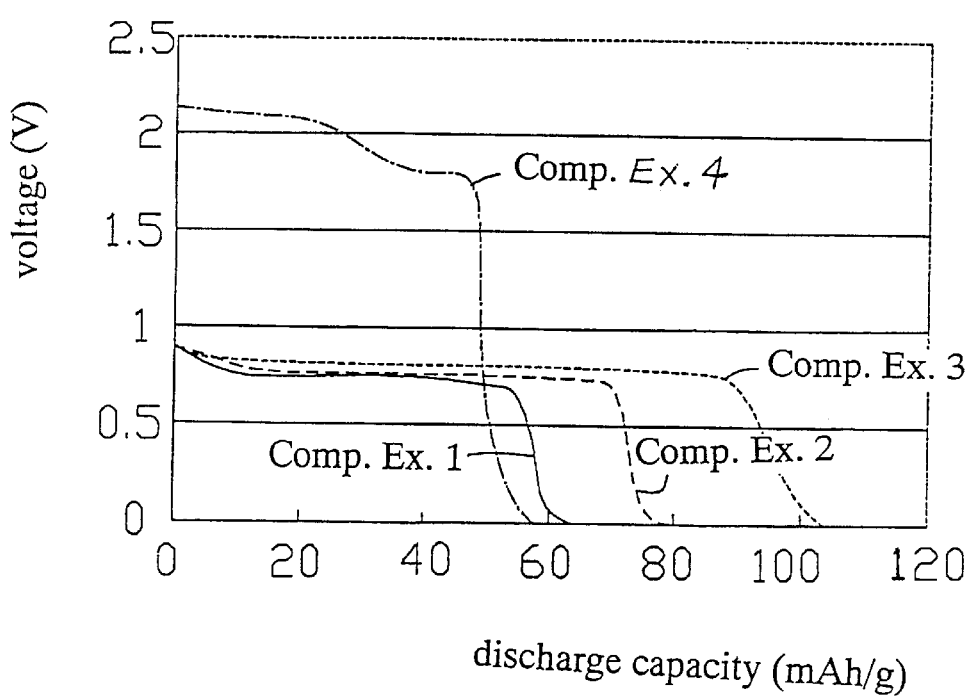
FIG. 4 is a diagram illustrative of variations in voltage provided by batteries of Comparative Examples 1–4 versus discharge capacity wherein a discharge current is fixed at 1 mA/cm$^2$.
Figure 5:
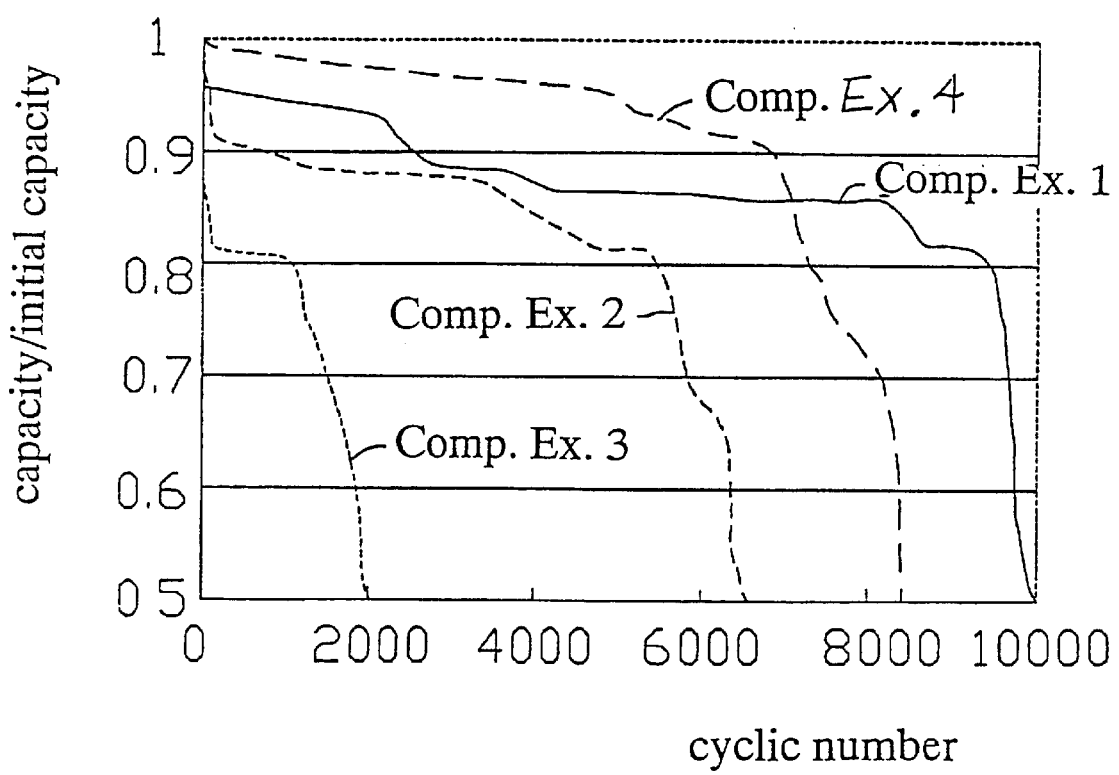
FIG. 5 is a diagram illustrative of variations in ratio of capacity to initial capacity of batteries of Comparative Examples 1–4 versus cycle number.

FIG. 2 is a diagram illustrative of variations in voltage provided by batteries of Examples 1–5 versus discharge capacity wherein a discharge current is fixed at 1 mA/Cm$^2$. FIG. 3 is a diagram illustrative of variations in ratio of capacity to initial capacity of batteries of Examples 1–5 versus cycle number. FIG. 4 is a diagram illustrative of variations in voltage provided by batteries of Comparative Examples 1–4 versus discharge capacity wherein a discharge current is fixed at 1 mA/cm$^2$. FIG. 5 is a diagram illustrative of variations in ratio of capacity to initial capacity of batteries of Comparative Examples 1–4 versus cycle number.

In FIGS. 2 and 4, it is shown that the novel batteries of Examples 1–5 show voltage drops at higher discharge capacities as compared to the conventional batteries of Comparative Examples 1–4. The novel batteries of Examples 1–5 have higher available discharge as compared to the conventional batteries of Comparative Examples 1–4. The novel batteries of Examples 1–5 are much superior than the conventional batteries of Comparative Examples 1–4 in the voltage-discharge capacity characteristics. The novel batteries of Examples 1–5 have higher energy efficiency in a unit weight and higher energy efficiency in a unit weight than the conventional batteries of Comparative Examples 1–4.

In FIGS. 3 and 5, it is shown that the novel batteries of Examples 1–5 show drops of the ratios of capacity to initial capacity at higher cyclic number as compared to the conventional batteries of Comparative Examples 1–4. The novel batteries of Examples 1–5 have higher durability as compared to the conventional batteries of Comparative Examples 1–4. The novel batteries of Examples 1–5 are much superior than the conventional batteries of Comparative Examples 1–4 in the durability or cyclic characteristic.

EXAMPLE 6

In this example, the sulfuric acid was used as a dopant to the negative and positive electrodes 1 and 2. Polyphenyl quinoxaline was used as an active material for forming the negative and positive electrodes 1 and 2 shown in FIG. 1. The sulfuric acid was used as dopant to the negative and positive electrodes 1 and 2.

The positive electrode 2 was prepared. Polyphenyl quinoxaline shown in the above general formula (8) was used as an active material. A vapor phase epitaxy carbon as the conductive auxiliary substance was mixed to polyphenyl quinoxaline at 1:1 in weight ratio of carbon to polyphenyl quinoxaline. Matacresol was further added at room temperature, in order to obtain a slurry. This slurry was then applied on a main face of the collector 4 by use of the doctor blade, whereby a film was formed on the main face of the collector 4'. The film was then dried in vacuum at 100–150° C. for one hour. Subsequently, the roll-press machine was used to press the film to make the film of 100 micrometers in thickness. The film was then cut to be shaped to form the positive electrode 2.

The negative electrode 1 was prepared in the same manner as in Example 1. Polyphenyl quinoxaline shown in the above general formula (8) was used as an active material. A vapor phase epitaxy carbon as the conductive auxiliary substance was mixed to polyphenyl quinoxaline at 1:1 in weight ratio of carbon to polyphenyl quinoxaline. Matacresol was further added at room temperature, in order to obtain a slurry. This slurry was then applied on a main face of the collector 4 by use of the doctor blade, whereby a film was formed on the main face of the collector 4'. The film was then dried in vacuum at 100–150° C. for one hour and thereafter an anneal was carried out. Subsequently, the roll-press machine was used to press the film to make the film of 100 micrometers in thickness. The film was then cut to be shaped to form the negative electrode 1.

A sulfuric acid solution was used for subjecting the negative and positive electrodes 1 and 2 to the electrochemical or chemical doping. The doped negative and positive electrodes 1 and 2 were placed in opposite sides of the separator 3 immersed with the electrolytic solution, whereby to obtain the secondary battery.

The secondary battery was charged to measure various characteristics thereof The secondary battery was charged in the range of 1–10C up to 0.5V at a constant current in the range of 1–10 mA/cm2, where a theoretical capacity was 27.5 Wh/kg per the weight of the negative active material, for example, polyphenyl quinoxaline. The actual capacity did not depend upon the discharge rate and was 24 Wh/kg per the weight of the negative active material. A ratio of the actual capacity to the theoretical capacity was high, for example, 87%. The cyclic characteristics were also measured. A cyclic number necessary for dropping the capacity to 80% of the initial capacity of 24 Wh/kg was 9000.

The reaction mechanism of polyphenyl quinoxaline was as shown in the above formula (10), wherein four electrons contribute to promote the reactions, whereby a great improvement in capacity of the battery can be obtained. Namely, there was obtained the battery which has a high energy efficiency in a unit volume and a high energy efficiency in a unit weight.

COMPARATIVE EXAMPLE 5

In this comparative example, in place of polyphenyl quinoxaline used in the above Example 6, polyaniline was used as an active material for forming the negative and positive electrodes 1 and 2 shown in FIG. 1. The sulfuric acid was also used as a dopant to the negative and positive electrodes 1 and 2.

The positive electrode 2 was prepared. Polyaniline was used as an active material. A vapor phase epitaxy carbon as the conductive auxiliary substance was mixed to polyaniline at 1:1 in weight ratio of carbon to polyaniline. Matacresol was further added at room temperature, in order to obtain a slurry. This slurry was then applied on a main face of the collector 4 by use of the doctor blade, whereby a film was formed on the main face of the collector 4'. The film was then dried in vacuum at 100–150° C. for one hour. Subsequently, the roll-press machine was used to press the film to make the film of 100 micrometers in thickness. The film was then cut to be shaped to form the positive electrode 2.

The negative electrode 1 was prepared. Polyaniline was used as an active material. A vapor phase epitaxy carbon as the conductive auxiliary substance was mixed to polyaniline at 1:1 in weight ratio of carbon to polyaniline. Matacresol was further added at room temperature, in order to obtain a slurry. This slurry was then applied on a main face of the collector 4 by use of the doctor blade, whereby a film was formed on the main face of the collector 4'. The film was then dried in vacuum at 100–150° C. for one hour and thereafter an anneal was carried out. Subsequently, the roll-press machine was used to press the film to make the film of 100 micrometers in thickness. The film was then cut to be shaped to form the negative electrode 1.

A sulfuric acid solution was used for subjecting the negative and positive electrodes 1 and 2 to the electrochemical or chemical doping. The doped negative and positive electrodes 1 and 2 were placed in opposite sides of the separator 3 immersed with the electrolytic solution, whereby to obtain the secondary battery.

The secondary battery was charged to measure various characteristics thereof. The secondary battery was charged in the range of 1–10C up to 0.5V at a constant current in the range of 1–10 mA/cm2, where a theoretical capacity was 21.2 Wh/kg per the weight of the negative active material, for example, polyaniline. The actual capacity did not depend upon the discharge rate and was 10 Wh/kg per the weight of the negative active material. A ratio of the actual capacity to the theoretical capacity was high, for example, 47.2%. The cyclic characteristics were also measured. A cyclic number necessary for dropping the capacity to 80% of the initial capacity of 10 Wh/kg was 10000.

The following table 2 shows characteristics of the novel battery of Example 6 and the conventional battery of Comparative Example 5.

TABLE 2

| | active material | dopant (anion) | electrolytic solution | voltage (V) | capacity (Wh/kg) |
|---|---|---|---|---|---|
| Ex. 6 | polyphenyl quinoxaline | $HSO_4^-$ $SO_4^{2-}$ | water | 0.5 | 24 |
| Co. 5 | polyaniline | $HSO_4^-$ $SO_4^{2-}$ | water | 0.5 | 10 |

Figure 6:
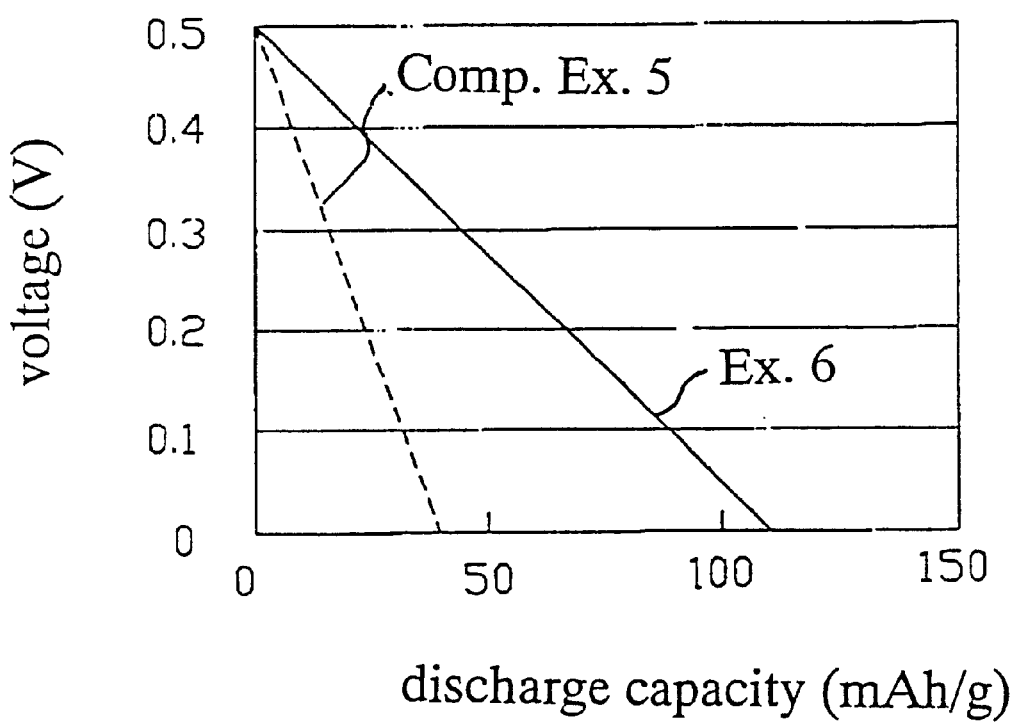
FIG. 6 is a diagram illustrative of variations in voltage of the novel battery of Example 6 and the conventional battery of Comparative Example 5 versus the discharge capacity, wherein the discharge current is fixed at 1 mA/cm$^2$.
Figure 7:
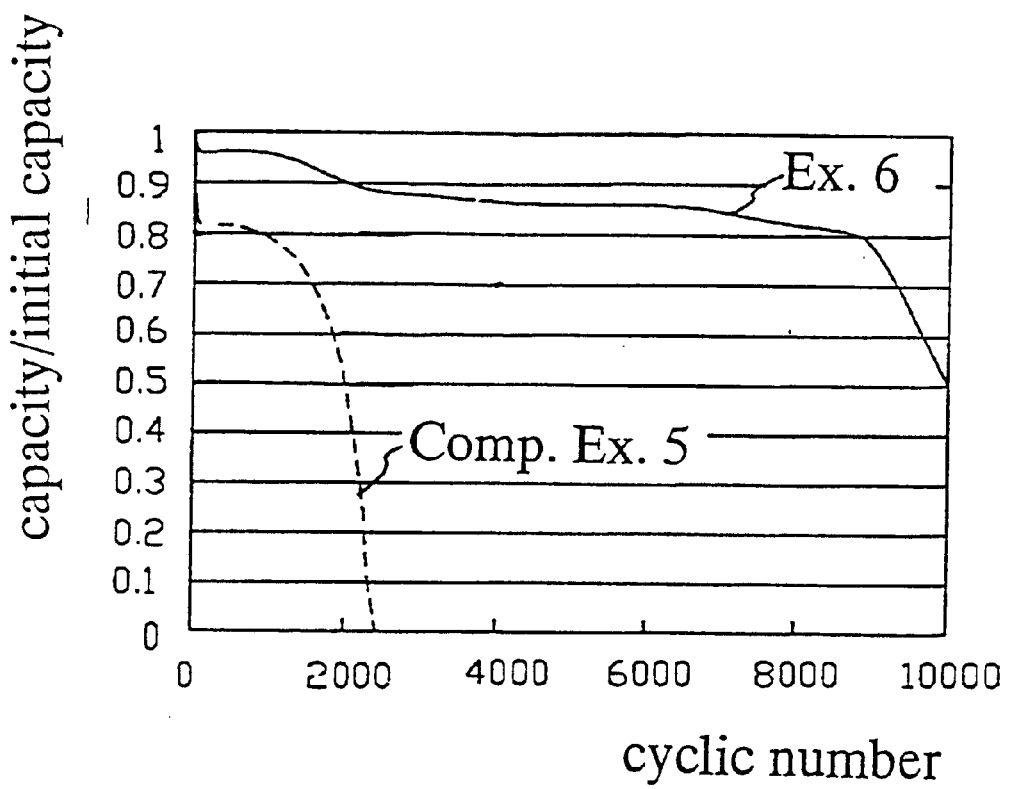
FIG. 7 is a diagram illustrative of variations in ratio of capacity to initial capacity of the novel battery of Example 6 and the conventional battery of Comparative Example 5 versus the cyclic number.

FIG. 6 is a diagram illustrative of variations in voltage of the novel battery of Example 6 and the conventional battery of Comparative Example 5 versus the discharge capacity, wherein the discharge current is fixed at 1 mA/cm². FIG. 7 is a diagram illustrative of variations in ratio of capacity to initial capacity of the novel battery of Example 6 and the conventional battery of Comparative Example 5 versus the cyclic number.

In FIG. 6, it is shown that the novel battery of Example 6 shows a higher voltage versus the discharge capacity as compared to the conventional battery of Comparative Example 5. The novel battery of Example 6 has a higher available discharge as compared to the conventional battery of Comparative Example 5. The novel battery of Example 6 is much superior than the conventional battery of Comparative Example 5 in the voltage-discharge capacity characteristics. The novel battery of Example 6 has higher energy efficiency in a unit weight and higher energy efficiency in a unit weight than the conventional battery of Comparative Example 5.

In FIG. 7, it is shown that the novel battery of Example 6 shows the drop of the ratios of capacity to initial capacity at much higher cyclic number as compared to the conventional battery of Comparative Example 5. The novel battery of Example 6 has higher durability as compared to the conventional battery of Comparative Example 5. The novel battery of Example 6 is much superior than the conventional battery of Comparative Example 5 in the durability or cyclic characteristic.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims all modifications which fall within the spirit and scope of the present invention.

What is claimed is:

1. An electrode containing a quinoxaline resin and an electrolyte which includes at least one of sulfuric acid ions and sulfonic acid ions.

2. The electrode as claimed in claim 1, wherein said quinoxaline resin has a polymerization degree in the range of 25–500.

3. The electrode as claimed in claim 2, wherein said quinoxaline resin has a polymerization degree in the range of 50–250.

4. The electrode as claimed in claim 1, wherein said quinoxaline resin has a weight average molecular weight in the range of 10000–1000000.

5. The electrode as claimed in claim 4, wherein said quinoxaline resin has a weight average molecular weight in the range of 20000–100000.

6. The electrode as claimed in claim 1, wherein said quinoxaline resin has a number average molecular weight in the range of 3000–100000.

7. The electrode as claimed in claim 6, wherein said quinoxaline resin has a number average molecular weight in the range of 5000–10000.

8. The electrode as claimed in claim 1, wherein said electrolyte is a dopant doped into said quinoxaline resin.

9. The electrode as claimed in claim 8, wherein said dopant comprises a polymer.

10. The electrode as claimed in claim 8, wherein said dopant causes an increase in concentration of proton in the vicinity of quinoxaline.

11. The electrode as claimed in claim 8, wherein said dopant is doped by use of an organic solvent.

12. The electrode as claimed in claim 8, wherein said dopant is doped by use of an acid having a concentration sufficient to increase an ion-conductivity.

13. A capacitor having at least an electrode of claim 1.

14. A battery having at least an electrode of claim 1.

15. An electrode containing a quinoxaline resin and an electrolyte which includes cations having ion radius of not more than 3 angstroms.

16. The electrode as claimed in claim 15, wherein said quinoxaline resin has a polymerization degree in the range of 25–500.

17. The electrode as claimed in claim 16, wherein said quinoxaline resin has a polymerization degree in the range of 50–250.

18. The electrode as claimed in claim 15, wherein said quinoxaline resin has a weight average molecular weight in the range of 10000–1000000.

19. The electrode as claimed in claim 18, wherein said quinoxaline resin has a weight average molecular weight in the range of 20000–100000.

20. The electrode as claimed in claim 15, wherein said quinoxaline resin has a number average molecular weight in the range of 3000–100000.

21. The electrode as claimed in claim 20, wherein said quinoxaline resin has a number average molecular weight in the range of 5000–10000.

22. The electrode as claimed in claim 15, wherein said electrolyte is a dopant doped into said quinoxaline resin.

23. The electrode as claimed in claim 22, wherein said dopant comprises a polymer.

24. The electrode as claimed in claim 22, wherein said dopant causes an increase in concentration of proton in the vicinity of quinoxaline.

25. The electrode as claimed in claim 22, wherein said dopant is doped by use of an organic solvent.

26. The electrode as claimed in claim 22, wherein said dopant is doped by use of an acid having a concentration sufficient to increase an ion-conductivity.

27. A capacitor having at least an electrode of claim 15.

28. A battery having at least an electrode of claim 15.

29. A method of forming an electrode comprising the steps of:
   forming a film containing a quinoxaline resin on a surface of a collector; and
   subjecting said quinoxaline resin to an electrolytic solution containing at least one of sulfuric acid ions and sulfonic acid ions for doping said quinoxaline resin with said electrolytic solution.

30. The method as claimed in claim 29, wherein said quinoxaline resin has a polymerization degree in the range of 25–500.

31. The method as claimed in claim 30, wherein said quinoxaline resin has a polymerization degree in the range of 50–250.

32. The method as claimed in claim 29, wherein said quinoxaline resin has a weight average molecular weight in the range of 10000–1000000.

33. The method as claimed in claim 32, wherein said quinoxaline resin has a weight average molecular weight in the range of 20000–100000.

34. The method as claimed in claim 29, wherein said quinoxaline resin has a number average molecular weight in the range of 3000–100000.

35. The method as claimed in claim 34, wherein said quinoxaline resin has a number average molecular weight in the range of 5000–10000.

36. The method as claimed in claim 29, wherein said electrolyte is a dopant doped into said quinoxaline resin.

37. The method as claimed in claim 36, wherein said dopant comprises a polymer.

38. The method as claimed in claim 36, wherein said dopant causes an increase in concentration of proton in the vicinity of quinoxaline.

39. The method as claimed in claim 36, wherein said dopant is doped by use of an organic solvent.

40. The method as claimed in claim 36, wherein said dopant is doped by use of an acid having a concentration sufficient to increase an ion-conductivity.

41. The method as claimed in claim 29, wherein said electrode is of a battery.

42. The method as claimed in claim 29, wherein said electrode is of a capacitor.

43. A method of forming an electrode comprising the steps of:
   forming a film containing a quinoxaline resin on a surface of a collector; and
   subjecting said quinoxaline resin to an electrolytic solution which includes cations having ion radius of not more than 3 angstroms for doping said quinoxaline resin with said electrolytic solution.

44. The method as claimed in claim 43, wherein said quinoxaline resin has a polymerization degree in the range of 25–500.

45. The method as claimed in claim 44, wherein said quinoxaline resin has a polymerization degree in the range of 50–250.

46. The method as claimed in claim 43, wherein said quinoxaline resin has a weight average molecular weight in the range of 10000–1000000.

47. The method as claimed in claim 46, wherein said quinoxaline resin has a weight average molecular weight in the range of 20000–100000.

48. The method as claimed in claim 43, wherein said quinoxaline resin has a number average molecular weight in the range of 3000–100000.

49. The method as claimed in claim 48, wherein said quinoxaline resin has a number average molecular weight in the range of 5000–10000.

50. The method as claimed in claim 43, wherein said electrolyte is a dopant doped into said quinoxaline resin.

51. The method as claimed in claim 50, wherein said dopant comprises a polymer.

52. The method as claimed in claim 50, wherein said dopant causes an increase in concentration of proton in the vicinity of quinoxaline.

53. The method as claimed in claim 50, wherein said dopant is doped by use of an organic solvent.

54. The method as claimed in claim 50, wherein said dopant is doped by use of an acid having a concentration sufficient to increase an ion-conductivity.

55. The method as claimed in claim 43, wherein said electrode is of a battery.

56. The method as claimed in claim 43, wherein said electrode is of a capacitor.

57. The electrode of claim 15, wherein the cations in the electrolyte having an ion radius of not more than 3 angstroms are selected from the group consisting of lithium ions, sodium ions, potassium ions, magnesium ions, calcium ions, barium ions, aluminum ions, iron ions, nickel ions, and tetramethylammonium ions.

58. The electrode of claim 15, wherein the cations in the electrolyte having an ion radius of not more than 3 angstroms are lithium ions.

59. The electrode of claim 15, wherein the cations in the electrolyte having an ion radius of not more than 3 angstroms are sodium ions.

60. The electrode of claim 15, wherein the cations in the electrolyte having an ion radius of not more than 3 angstroms are potassium ions.

61. The electrode of claim 15, wherein the cations in the electrolyte having an ion radius of not more than 3 angstroms are magnesium ions.

62. The electrode of claim 15, wherein the cations in the electrolyte having an ion radius of not more than 3 angstroms are calcium ions.

63. The electrode of claim 15, wherein the cations in the electrolyte having an ion radius of not more than 3 angstroms are barium ions.

64. The electrode of claim 15, wherein the cations in the electrolyte having an ion radius of not more than 3 angstroms are aluminum ions.

65. The electrode of claim 15, wherein the cations in the electrolyte having an ion radius of not more than 3 angstroms are iron ions.

66. The electrode of claim 15, wherein the cations in the electrolyte having an ion radius of not more than 3 angstroms are nickel ions.

67. The electrode of claim 15, wherein the cations in the electrolyte having an ion radius of not more than 3 angstroms are tetramethylammonium ions.

68. The electrode of claim 43, wherein the cations having an ion radius of not more than 3 angstroms are selected from the group consisting of lithium ions, sodium ions, potassium ions, magnesium ions, calcium ions, barium ions, aluminum ions, iron ions, nickel ions, and tetramethylammonium ions.

69. The electrode of claim 43, wherein the cations having an ion radius of not more than 3 angstroms are lithium ions.

70. The electrode of claim 43, wherein the cations having an ion radius of not more than 3 angstroms are sodium ions.

71. The electrode of claim 43, wherein the cations having an ion radius of not more than 3 angstroms are potassium ions.

72. The electrode of claim 43, wherein the cations having an ion radius of not more than 3 angstroms are magnesium ions.

73. The electrode of claim 43, wherein the cations having an ion radius of not more than 3 angstroms are calcium ions.

74. The electrode of claim 43, wherein the cations having an ion radius of not more than 3 angstroms are barium ions.

75. The electrode of claim 43, wherein the cations having an ion radius of not more than 3 angstroms are aluminum ions.

76. The electrode of claim 43, wherein the cations having an ion radius of not more than 3 angstroms are iron ions.

77. The electrode of claim 43, wherein the cations having an ion radius of not more than 3 angstroms are nickel ions.

78. The electrode of claim 43, wherein the cations having an ion radius of not more than 3 angstroms are tetramethylammonium ions.

\* \* \* \* \*